United States Patent
Bono et al.

(10) Patent No.: US 7,569,952 B1
(45) Date of Patent: Aug. 4, 2009

(54) HIGH EFFICIENCY, INDUCTIVE VIBRATION ENERGY HARVESTER

(75) Inventors: David C. Bono, Wellesley, MA (US);
Alan Sliski, Lincoln, MA (US);
Jiankang Huang, Roslindale, MA (US);
Robert C. O'Handley, Andover, MA (US)

(73) Assignee: Ferro Solutions, Inc., Woburn, MA (US)

( * ) Notice: Subject to any disclaimer, the term of this patent is extended or adjusted under 35 U.S.C. 154(b) by 856 days.

(21) Appl. No.: 10/826,852

(22) Filed: Apr. 16, 2004

Related U.S. Application Data (60) Provisional application No. 60/463,537, filed on Apr. 18, 2003.

(51) Int. Cl.
*H02K 33/00* (2006.01)
(52) U.S. Cl. .................................. 310/15; 310/81
(58) Field of Classification Search ............ 310/81, 310/14, 15, 30
See application file for complete search history.

(56) References Cited

U.S. PATENT DOCUMENTS

| | | | |
|---|---|---|---|
| 3,980,908 A * | 9/1976 | McClintock | 396/465 |
| 4,823,617 A | 4/1989 | Hase et al. | |
| 5,658,485 A | 8/1997 | Cava et al. | |
| 5,675,252 A | 10/1997 | Podney | |
| 5,814,907 A * | 9/1998 | Bandera | 310/14 |
| 5,940,362 A | 8/1999 | Plonsky et al. | |
| 5,945,747 A * | 8/1999 | Neff et al. | 310/12 |
| 6,279,406 B1 | 8/2001 | Li et al. | |
| 6,437,558 B2 | 8/2002 | Li et al. | |
| 6,515,382 B1 | 2/2003 | Ullakko | |
| 6,580,271 B2 | 6/2003 | Li et al. | |
| 6,610,427 B2 | 8/2003 | Kashiwaya et al. | |
| 6,628,019 B2 * | 9/2003 | Carroll | 310/30 |
| 6,686,205 B1 | 2/2004 | Schultz et al. | |
| 6,809,515 B1 | 10/2004 | Li et al. | |
| 6,809,516 B1 | 10/2004 | Li et al. | |
| 6,835,463 B2 | 12/2004 | Srinivasan | |

(Continued)

FOREIGN PATENT DOCUMENTS

JP 11258077 A 9/1999

(Continued)

OTHER PUBLICATIONS

Amirtharaja, R., et al., "Self-Powered Signal Processing Using Vibration-Based Power Generation", IEEE Journal of Solid State Circuits, v. 33, n. 5, pp. 687-695 (1998).

(Continued)

*Primary Examiner*—Nguyen N Hanh
(74) *Attorney, Agent, or Firm*—Rissman Hendricks & Oliverio LLP (57) ABSTRACT

An inductive energy harvester comprises a permanent magnet magnetic field source attached by a pair of compact spiral disk springs to an induction coil. The springs position the magnet so that the induction coil surrounds one end of the magnet where the flux density is greatest. In addition, the magnetic flux emerging from that end of the magnet is enhanced by a disk of magnetic material having high permeability and high flux density. In another embodiment, the magnetic field source comprises two dipole magnets arranged in opposing flux relationship with a thin layer of high flux density, high magnetic permeability material located in a gap between the magnets.

26 Claims, 6 Drawing Sheets

U.S. PATENT DOCUMENTS

| | | | |
|---|---|---|---|
| 6,984,902 | B1 | 1/2006 | Huang et al. |
| 7,023,206 | B2 | 4/2006 | Viehland et al. |
| 2001/0028245 | A1 | 10/2001 | Li et al. |
| 2002/0011123 | A1 | 1/2002 | O'Boyle |
| 2002/0036282 | A1 | 3/2002 | Chiang et al. |
| 2002/0172060 | A1 | 11/2002 | Takeuchi |
| 2003/0197970 | A1 | 10/2003 | Srinivasan |

FOREIGN PATENT DOCUMENTS

| | | |
|---|---|---|
| WO | WO 00/60369 A1 | 10/2000 |

OTHER PUBLICATIONS

Beeby et al., "Review Article" Measurement Science and Technology, Dec. 1, 2006, vol. 17, No. 1,2 Institute of Physics Publishing, Bristol, GB.

Churchill, D.L., et al., "Strain Energy Harvesting for Wireless Sensor Networks," Smart Structures and Materials 2003: Smart Electronics, MEMS, BioMEME, and Nanotechnology, Proceedings of SPIE, vol. 5055, (2003).

El-Hani, M., et al., "Design and Fabrication of a New Vibration-Based Electromechanical Power Generator", Sensors and Actuators, Elsevier Science B.V., 2001, pp. 335-342.

Ghandi, K., "Compact Piezoelectric Based Power generation", Continuum Controls, Inc., DARPA Energy Haversting Program Review, 2000.

Glynee-Jones, P., et al., "An Electromagnetic, Vibration-Powered Generator for Intelligent Sensor Systems", Sensors and Actuators, pp. 344-349, Elsevier B.V.

Glynne-Jones, P., et al., "The Modelling of a Piezoelectric Vibration Powered Generator for Microsystems", Transducer '01—Eurosensors XV, The 11th International Conference on Solid-State Sensors and Actuators, Munich, Germany, Jun. 10-14, 2001, pp. 46-49.

Glynne-Jones, P., et al., "Towards a Piezoelectric Vibration-Powered Microgenerator", IEE Proc.-Sci Meas. Technol., vol. 148, No. 2, Mar. 2001, pp. 68-72.

Grimes, C.A., et al., "Magnetoelastic Sensors For Remote Query Environmental Monitoring" Smart Mater. Struct. 8 (1999( pp. 639-646, 1999 IOP Publishing Ltd., Printed in U.K.

James, E.P., et al., "A Wireless Self-Powered Micro-System for Condition Monitoring", Department of Electronics and Computer Science, University of Southampton, Hampshire, England, 4 pages.

James, E.P., et al., "An Investigation of Self-Powered Systems for Condition Monitoring Applications", Sensors and Actuators, pp. 171-176, Elsevier B. V.

Li, Yi-Qun, et al., "An Innovative Passive Solid-State Magnetic Sensor", www.sensorsmag.com, Oct. 2000, pp. 52-54.

Lynch, B.J., et al., "A New Magnetic Sensor Technology", A New Magnetic Sensor Technology, pp. 13-20, presented in part at the Undersea Defence Technology Conference in London from Feb. 7-9, 1990.

Meninger, S., et al., "Vibration-to-Electric Energy Conversion", IEEE Transactions on VLSI Systems, v. 9, n. 1, p. 64 (2001).

Mermelstein, M.D., "Magnetoelastic Amorphous Metal Fluxgate Magnometer", Electronics Letters, 1986, vol. 22, No. 10, pp. 525-526.

Mermelstein, M.D., et al., "Low-Frequency Magnetic Field Detection With a Magnetostrictive Amorphous Metal Ribbon", Applied Physics Letter 51, Aug. 1987, pp. 545-547.

Mermelstein, Marc D., "A Magnetoelastic Metallic Glass Low-Frequency Magnetometer", IEEE Transactions on Magnetics, vol. 28, No. 1, Jan. 1992, pp. 36-56.

Mori, Kiyotaka, et al., "Magnetoelectric Coupling in Terfenol-D/Polyvinylidenedifluoride Composites", Applied Physics Letters, vol. 81, No. 1, Jul. 1, 2002, pp. 100-101.

Pantinakis, A., et al., "High-Sensitivity Low-Frequency Magnetometer Using Mangetostrictive Primary Sensing and Piezoelectric Signal Recovery", Electronics Letters, 1986, vol. 22, No. 14, pp. 737-738.

Prieto, J. L., et al., "Magnetization Processes and Optimal Performance of Magnetostrictive Piezoelectric Sensors", Journal of Applied Phyiscs, vol. 79, No. 9, May 1, 1996, pp. 7099-7105.

Roundy, Shad, et al., "A Study of Low Level Vibrations as a Power Source for Wireless Sensor Nodes", Computer Sommunications 26 (2003) pp. 1131-1144, Elsevier Science B.V.

Ryu, Jungho, et al., "Magnetoelectric Properties in Piezoelectric and Magnetostrictive Laminate Composites", Japanese Journal of Applied Physics, vol. 40, Part 1, No. 8, pp. 4948-4951, Aug. 2001.

Shearwood, C., et al., "Development of an Electromagnetic Microgenerator", Electronics Letters.

Shenck, N.S., et al., "Energy Scavenging with Shoe-Mounted Piezoelectrics", IEEE Microelectronics, v. 21, n. 3, May-Jun. 2001, p. 30-42.

Shin, K.H., et al., "Preparation and Properties of Elastically Coupled Electro-Magnetic Elements With a Bonding Structure", IEEE Transactions on Magnetics, vol. 34, No. 4, Jul. 1998, pp. 1324-1326.

Van Suchtelen, J., "Product Properties: A New Application of Composite Materials", Philips Res. Repts. 27, pp. 28-37, 1972.

White, N.M., et al., "A Novel Thick-Film Piezoelectric Micro-Generator", Smart Materials and Structures 10, 2001, p. 850-852, Institute of Physics Publishing.

White, N.M., et al., "Design and Modelling of a Vibration-Powered Micro-Generator", Measurement+Control, vol. 34, Nov. 2001, pp. 267-271.

Williams, C.B., et al., "Analysis of a Micro-Electric Generator For Microsystems," Transducer '95—Eurosensors IX, The 8th International Conference on Solid-State Sensors and Actuators, and Eurosensors IX, Stockholm, Sweden, Jun. 25-29, 1995, pp. 369-372.

Van Den Boomgaard, et al. "Magnetoelectricity In Piezoelectric-Magnetostrictive Composites",Ferroelectrics, 1976, vol. 10, pp. 295-298.

Van Den Boomgaard, et al., "Piezoelectric-Piezomagnetic Composites With Magnetoelectric Effect", Ferroelectrics, 1976, vol. 14, pp. 727-728.

Levitin, R.Z., et al., "Magnetostriction measurements under high magnetic fields by a piezoelectric transducer glued on the sample", Physica B 177 (1992) 59-62.

\* cited by examiner

HIGH EFFICIENCY, INDUCTIVE VIBRATION ENERGY HARVESTER

RELATED APPLICATIONS

This application claims the benefit of U.S. provisional application 60/463,537, filed Apr. 18, 2003.

FIELD OF THE INVENTION

This invention relates to apparatus and methods for converting small mechanical movements, such as vibrations and oscillations, into electrical energy.

BACKGROUND OF THE INVENTION

An energy harvester is a device that converts mechanical movements into electrical energy. This electrical energy can then be stored or used by other devices. Thus, an energy harvester of this type can utilize energy that would otherwise be lost. For example, the vibrations of an air duct can be converted to electrical energy by an energy harvester and the electrical energy can be then be used to power a sensor that measures the temperature of air in that duct. Therefore, the sensor will not require periodic battery changes.

Applications of such energy harvesters include supplementing other power sources or recharging batteries, thereby extending battery life; elimination of wiring for electrical devices remote from a power source, the powering of mobile electronic instruments and powering wireless monitoring applications. These latter applications typically comprise the sensing of local conditions to generate monitoring data, optionally, the processing of that data and the wireless communication of the data to a central data processing point. Such applications include wireless health monitoring of machine, human or vehicle systems, wireless monitoring of temperature, air or fluid flow, humidity, and gas content in heating, ventilation and air-conditioning (HVAC) systems; wireless monitoring of traffic flow, turbulence, noise, troop or other personnel movements; wireless, self powered security systems; and systems including passive detection of creep or crack propagation in structures to allow for "condition-based maintenance."

There are a variety of conventional devices for generating electrical power from vibrations, oscillations or other mechanical motions. These devices include inductive devices, capacitive devices, and piezoelectric devices. Capacitive devices make use of the capacitor equation:

$$Q(t) = CV = \kappa\varepsilon_o \frac{A(t)}{d(t)} V$$

The devices are arranged so that external vibrations vary the capacitor plate overlap area (A) and/or the capacitor plate spacing (d). Thus, a vibration causes a change in charge on the capacitor when a voltage is applied to the device. When the capacitor is used to drive a load, the charge flow is damped with a characteristic decay time given by the time constant, $\tau = RC$. These capacitive devices generate an electrical signal that varies with a frequency that is the same as the vibration frequency, but require an input voltage.

Piezoelectric materials generate a voltage when they are stressed in accordance with a piezoelectric equation:

$$V_i = g_{ij}^{piezo} \sigma_j \cdot d_i$$

where $g_{ij}$ is a coefficient that describes the ability of the piezoelectric material to convert a stress in coordinate direction j, to a voltage in direction i, $\sigma_j$ is a Cartesian component of stress applied to the piezoelectric material, and $d_i$ is the spacing between electrodes that measure the voltage, $V_i$ in the same direction. Ceramic (polycrystalline) piezoelectric elements, flexible piezoelectric fiber composites, or polymeric electroactive materials can be used in various energy harvesting applications. One proposed class of electroactive energy harvesters makes use of the periodic compression in the heel of a shoe or boot caused by walking to stress a piezoelectric material in order to generate power. Walking generates a stress on the order of 200 lbs. over 10 in$^2$ or 1 to 2×10$^5$ Pa. With piezoelectric stress coupling coefficients typically in the range 5-20 millivolt/(meter-Pa), the voltage generated by a piezoelectric energy harvester in such an application would be of order 1.3 volts, with a power density (½CV$^2$)ω on the order of 2/R watts/cm$^3$. However, because this device is limited in its charge, the load resistance must be high to prevent rapid loss of charge. Hence the power density is small, typically measuring in the μW/cm$^3$ range.

In a real device constructed with piezoelectric polymers, walking impact generated an average power of approximately 8 milliwatts ("Energy Scavenging with Shoe-Mounted Piezoelectrics", N. S. Shenck and J. A. Paradiso, *IEEE Microelectronics*, v. 21, n. 3, May-June 2001, p. 30-42) corresponding to a power density of order 1 mW/cm$^3$. Another device using piezoelectric fiber composites projects an ultimate average power density of approximately 0.1 milliwatts/cm$^3$ ("Compact Piezoelectric Based Power generation", K. Ghandi, Continuum Controls, Inc., *DARPA Energy Harvesting Program Review*, 2000). The small size of these devices puts their energy densities in the range of 0.1 to 1.0 milliwatts/cm$^3$ with projections up to 5 milliwatts/cm$^3$.

Inductive devices that convert vibrations to electrical power essentially work like an acoustic speaker (in which electrical signals are converted into vibrations of the speaker cone) in reverse. This operation can also be considered on the basis of the generator principle, that is, Faraday's law of induction:

$$V(t) = N \frac{\partial B}{\partial t} A$$

The voltage generated by induction is proportional to the number of turns, N, in an electrical winding and the rate of flux change through those windings $$\frac{\partial B}{\partial t} A,$$

where ∂B is the flux density change during the vibration and A is the area of the coil through which the flux change perpendicular to the coil plane is measured by the N turns.

In order to increase output voltage at a given frequency, either the product NA must be increased or the flux change ∂B must be increased. Consequently, the power produced by inductive energy harvesters is presently limited by coil size (NA), the magnitude of the vibration amplitudes and frequencies (to increase $$\frac{\partial B}{\partial t}$$

and the need for heavy, powerful permanent magnets to produce a large flux density change ∂B. Typical reported output voltages are low unless the device is large. For example, with a flux ∂B=0.5 tesla coupled to a 30 Hz vibration so that $$\frac{\partial B}{\partial t} = 2\pi f \Delta B \approx 100$$

Tesla/second, a device with a one $cm^2$ area sensed by a 1000 turn coil generates an induced voltage of approximately ten volts into an infinite load impedance. However, in a practical system, as the load impedance decreases, current flows and, in accordance with Lenz's law, generates a back EMF that opposes the motion of the magnet and opposes the induced voltage thereby reducing the power output. Consequently, typical systems described in the literature report an average power output of approximately only 0.3 microwatts in a small device (for example, see "Development of an Electromagnetic Microgenerator", C. Shearwood and R. B. Yates, *Electronics Letters*, v. 13, p. 1883 (1997)). The maximum power output of small inductive energy harvesters has been estimated to be 400 microwatts ("Self-Powered Signal Processing Using Vibration-Based Power Generation", R. Amirtharaja and A. Chandarakasan, *IEEE Journal of Solid State Circuits*, v. 33, n. 5, pp. 687-695 (1998). The size of these devices indicates that the power density that can be achieved by inductive harvesters is in the range of 0.005 to 0.5 milliwatts/$cm^3$.

As a result, attempts have been made to vary the coil and magnet configuration to increase the power output. An example of a prior art device is disclosed in U.S. Published Patent Application No. 20020172060, which describes an inductive vibration energy harvester that also damps vibrations (as any energy harvester will, in proportion to the amount of energy it scavenges from the vibration source). The disclosed device consists of a dipole magnet and an induction coil that encircles the magnet close to the magnet midpoint. In the absence of vibration, the magnet and induction coil are held in relative position by a pair of coil springs. The two components move relative to each other under the action of the external vibration so that the induction coil generates electrical power as described above. In a second embodiment in the cited prior art patent, two orthogonal dipole magnets move independently along their respective axes, relative to two induction coils. In both embodiments, each coil contains a soft iron flux concentrator sleeve through which the magnet passes. However, the disclosed design does not result in a large flux change at the coil location in response to vibrations because the ends of the magnet, where the greatest flux change occurs, are positioned far from the coil. Accordingly, in experimental models constructed with this design, the flux change through the coil as a result of vibration is very small and power harvested from 60 Hz vibrations at a strength of about 0.5 g is limited to less than one milliwatt for harvesters measuring approximately 10 cm×10 cm×10 cm.

Accordingly, there is a need for an energy harvester with an increased efficiency and output.

SUMMARY OF THE INVENTION

In accordance with the principles of the invention, an inductive energy harvester comprises a permanent magnet magnetic field source attached by a pair of compact spiral disk springs to an induction coil. The springs position the magnet so that the induction coil surrounds one end of the magnet where the change in flux density is highest. In addition, the magnetic flux emerging from that end of the magnet is enhanced and directed toward the coil by a disk of high magnetic permeability material, such as soft iron. The coil and magnet are also surrounded by a return flux yoke made of a magnetic material having high permeability and high flux density. The flux yoke further enhances the magnetic flux changes through the coil by reducing magnetic field fringing effects (the yoke provides a low-reluctance return path for the flux).

In another embodiment, the magnetic field source comprises two dipole magnets arranged in opposing flux relationship with respect to each other and having a thin layer of high flux density, high magnetic permeability material located in a gap between the magnets. This arrangement provides a means of enhancing the magnetic flux emerging from the gap between the two magnets. As with the previous embodiment, the double permanent magnet magnetic field source is attached by a pair of compact spiral disk springs to an induction coil located in the vicinity of the gap between the magnets.

In still another embodiment, the design of the compact disk springs can be adjusted to change their stiffness. In this manner, the mechanical resonance frequency of the inductive energy harvester can be altered to suit particular applications.

BRIEF DESCRIPTION OF THE DRAWINGS

The above and further advantages of the invention may be better understood by referring to the following description in conjunction with the accompanying drawings in which:

FIGS. 2A-2B show alternative embodiments of springs useful in the energy harvester of the present invention, wherein

DETAILED DESCRIPTION

It is generally believed that once the mechanical resonance part of an energy harvester has been optimized, it makes little difference which mode of transduction (capacitive, electroactive or magnetic induction is used. (see, for example, "Analysis of a micro electric generator for Microsystems", C. B. Williams and R. B. Yates, *Sensors and Actuators*, A52, pp. 8-11, (1996) and "A study of low level vibrations as a power source for wireless sensor nodes", S. Roundy, P. K. Wright and J. M. Rabaey, *Computer Communications*, v. 26, n. 11, pp. 1131-1144 (2003)). We have found this not to be the case. We have made several inductive vibration energy harvesters of comparable volumes and improvements in design have led to more than an order of magnitude increase in power output, now at about 9 mW for vibrations at 21 Hz having an acceleration of 0.1 g (1 ms$^{-2}$).

Figure 1:
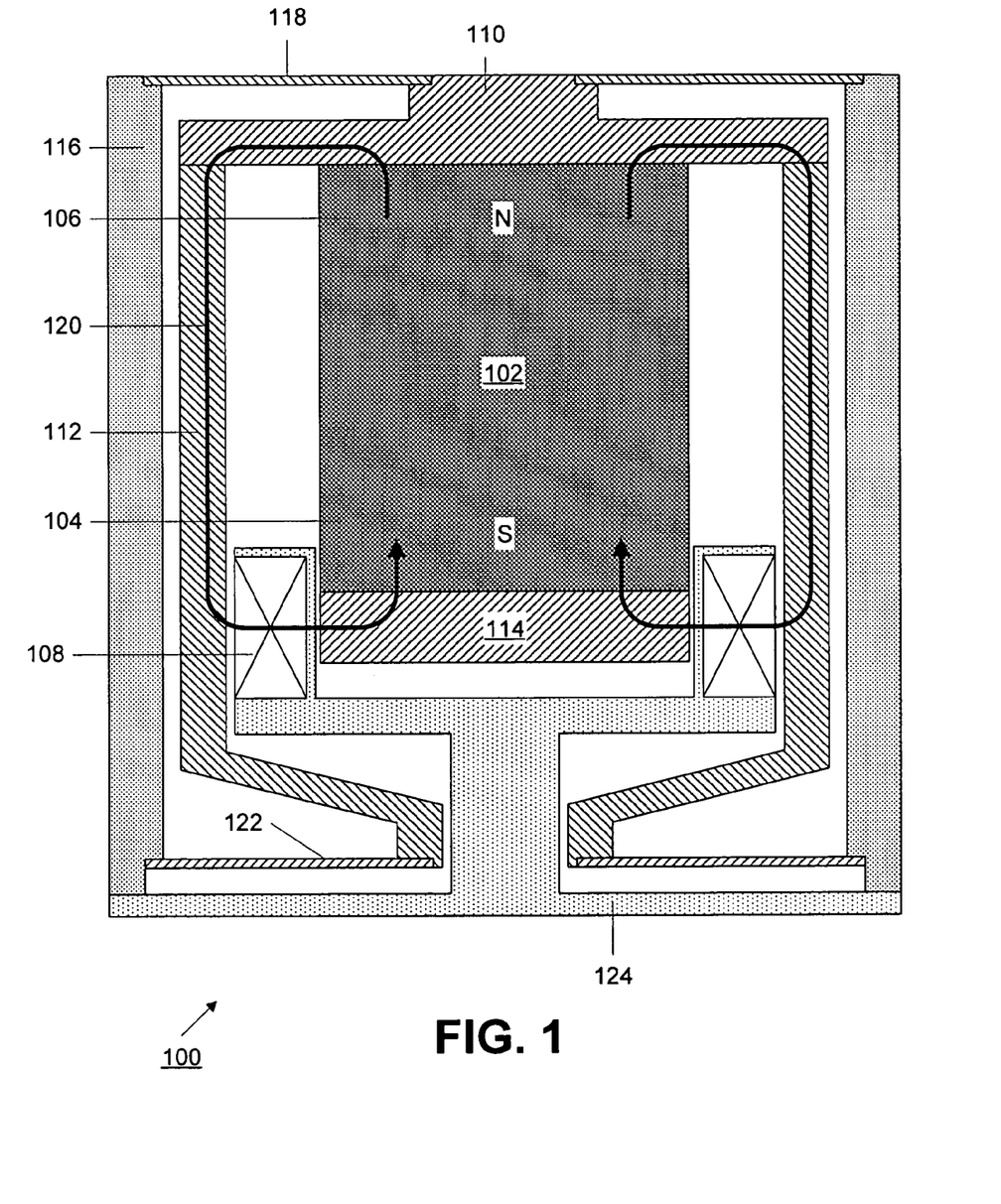
FIG. 1 is a partial cross-sectional diagram of a first embodiment of an inductive vibration energy harvester constructed in accordance with the principles of the present invention.

FIG. 1 shows a schematic partial cross-sectional diagram of an inductive energy harvester 100 constructed in accordance with the principles of the invention. The embodiment shown in FIG. 1 has cylindrical symmetry, but this is not necessary to achieve the advantages of the invention. It may have a square symmetry, a rectangular symmetry, or another symmetry as befits the application. This embodiment comprises a single permanent magnet 102 where one magnetic pole 104 is positioned within an induction coil 108. Although the south pole 104 of magnet 102 is positioned within coil 108 in FIG. 1, those skilled in the art would recognize that magnet 102 could be mounted with reversed polarity without departing from the spirit and scope of the invention.

Illustratively, the permanent magnet 102 could be an Fe—Nd—B sintered magnet. Sm—Co magnets could also be used. Such a magnet will typically generate a magnetic field of about 0.5-0.8 Tesla near the induction coil 108. The induction coil itself could be several thousand turns of 44-gauge wire. The specific numbers of turns and other gauges can be adjusted to suit specific applications.

The opposite pole 106 of magnet 102 is bonded, or fastened, to a flux yoke comprising a piece 110 made of a material with a high flux density and high magnetic permeability, such as soft iron. The piece 110 is, in turn, attached to a cylindrical flux yoke 112 that surrounds magnet 102. The magnetic flux emerging from the end 104 of the magnet 102 is compressed to a higher flux density by a disk 114 of high magnetic permeability, high flux density material, such as soft iron. The flux yoke piece 110, flux yoke 112 and flux concentrator disk 114 form a magnetic circuit that concentrates and channels the magnetic flux as indicated schematically by arrow 120 to insure that the flux density is maximized in the area of induction coil 108. The piece 110, flux yoke 112 and flux concentrator disk 114 could also be fabricated from FeCo (Hyperco), which can be made to have high permeability (very small magnetic anisotropy) and higher flux density than soft iron.

The flux yoke piece 110 and flux yoke 112 are attached to a non-magnetic housing 116 by a pair of springs 118 and 122, whose detailed design can be adjusted to alter their stiffness and hence the mechanical resonance frequency of the device 100. The bobbin on which the induction coil 108 is wound is supported by a non-magnetic pedestal 124 that is also attached to the housing 116. The springs 118 and 122 allow the magnet 102 as well as its accompanying pieces 110 and 114 and yoke 112, to move relative to the housing 116, pedestal 124 and induction coil 108. The source of vibration can be attached to either the magnetic structure 102, 110 and 112, or to, preferably, the housing 116 to cause the two parts of the energy harvester 100 to move relative to each other.

Figure 2A:
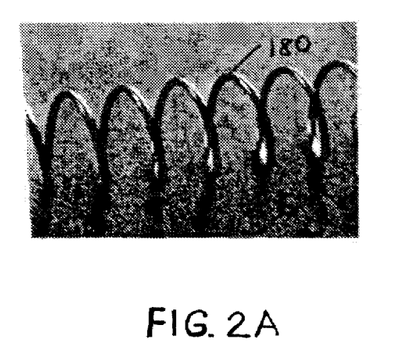
FIG. 2A is a perspective view of a coil spring and FIG. 2B is a top detailed view of the spiral disk springs used in the embodiment illustrated in FIG. 1.
Figure 2B:
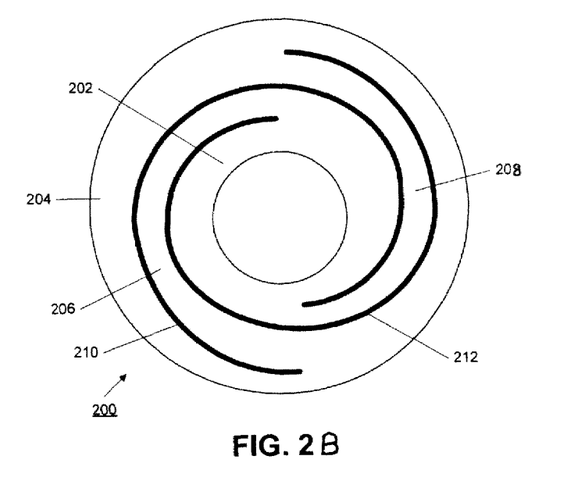

The springs 118 and 122 that attach the magnetic members to the housing can be any conventional springs, such as leaf and coil springs (see e.g. coil spring 180 in FIG. 2A). In one embodiment, springs 118 and 122 are spiral disk springs. FIG. 2B shows a top view of the spiral disk springs that can be used to couple the magnetic structure to the housing 116. Preferably these springs can be fabricated from any high-quality non-magnetic spring material, such as beryllium-copper or stainless steel. Each spring comprises a metal disk 200 with a central land 202 that is connected to an edge ring 204 by spiral arms 206 and 208 formed by spiral slots cut into the disk 200, of which slots 210 and 212 are shown. The mechanical stiffness of the springs can be controlled by varying the disk thickness and/or the number, width and length of the slots and thus the number, width and length of the spiral arms that support the land 202. Spiral disk springs, such as spring 200, are useful because they are compact and energy efficient as compared to leaf or coil springs.

Figure 3:
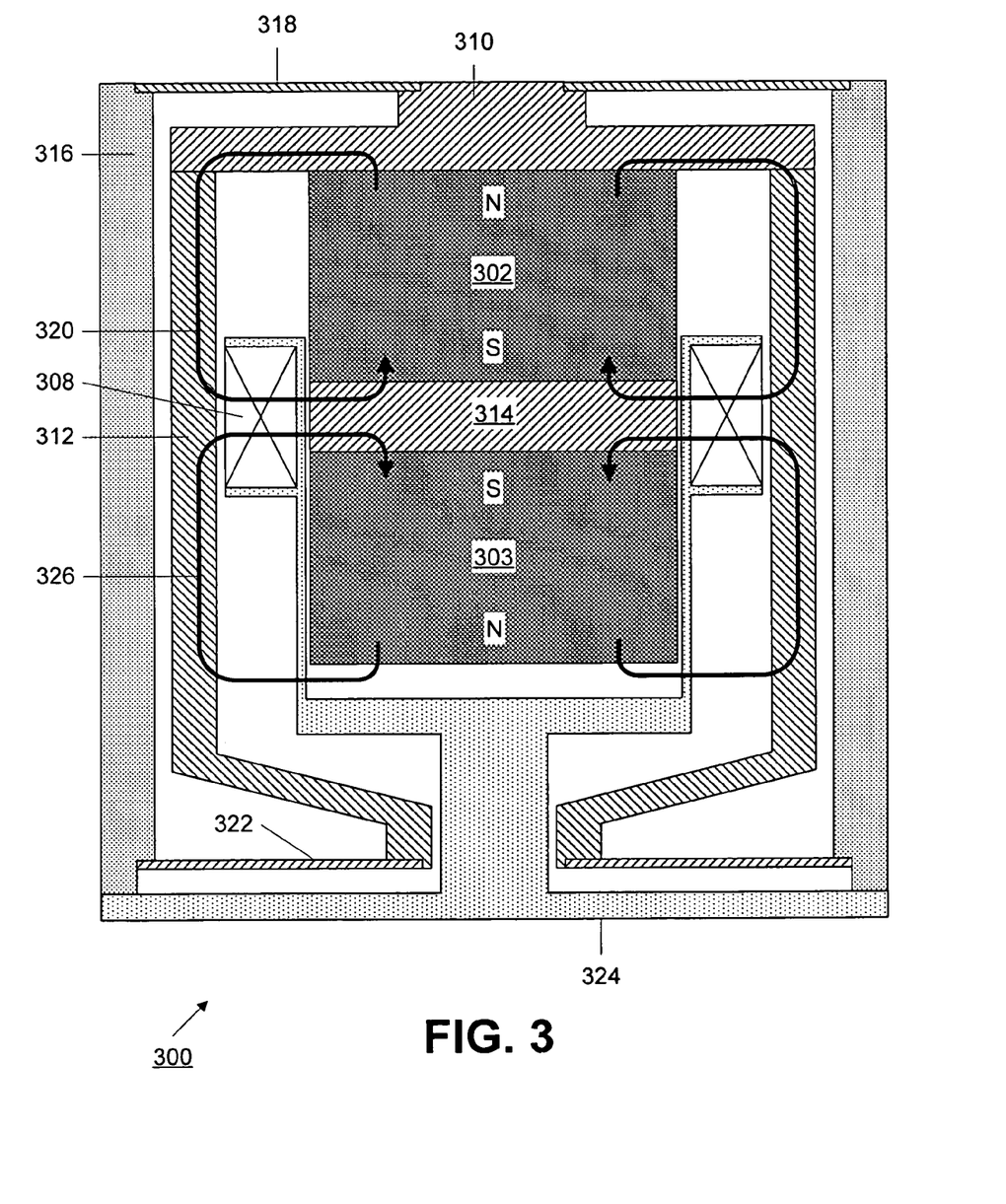
FIG. 3 is a partial cross-sectional diagram of a second embodiment of an inductive vibration energy harvester constructed in accordance with the principles of the present invention and using a magnetic field source constructed of two opposing magnets.

FIG. 3 illustrates another embodiment 300 in which two oppositely-poled magnets provide flux concentration in the vicinity of the induction coil. In FIG. 3, components that are equivalent to those illustrated in FIG. 1 have been given equivalent numeral designations. For example, pole piece 110 is equivalent to pole piece 310.

In place of the single magnet 102 illustrated in FIG. 1, two magnets 302 and 303 have been placed in opposing flux relationship (north pole to north pole or south pole to south pole). A high-flux-density, high-magnetic-permeability, low-reluctance flux concentrator disk 314 is placed between the magnets to further concentrate the magnetic flux emerging toward the coils. For example, disk 314 can be made of soft iron. With this magnet circuit the magnetic field follows the path indicated by arrows 320 and 326. The induction coil 308 has been relocated into the vicinity of the flux concentrator 314 so that it is in the high flux region. The remainder of the embodiment functions in a similar manner to the embodiment illustrated in FIG. 1.

Table 1 shows some experimental results for measured output power as a function of vibration acceleration (g force) for the inductive harvester illustrated in FIG. 3. The harvester is approximately 5 cm in diameter and 5 cm high. The output voltage developed by the induction coil 308 is delivered to a 600 kOhm load resistor.

TABLE 1

| Acceleration (milli g) | Power (milliwatts) |
|---|---|
| 100 | 9.3 |
| 50 | 2.4 |
| 20 | 0.41 |
| 10 | 0.01 |

Figure 4:
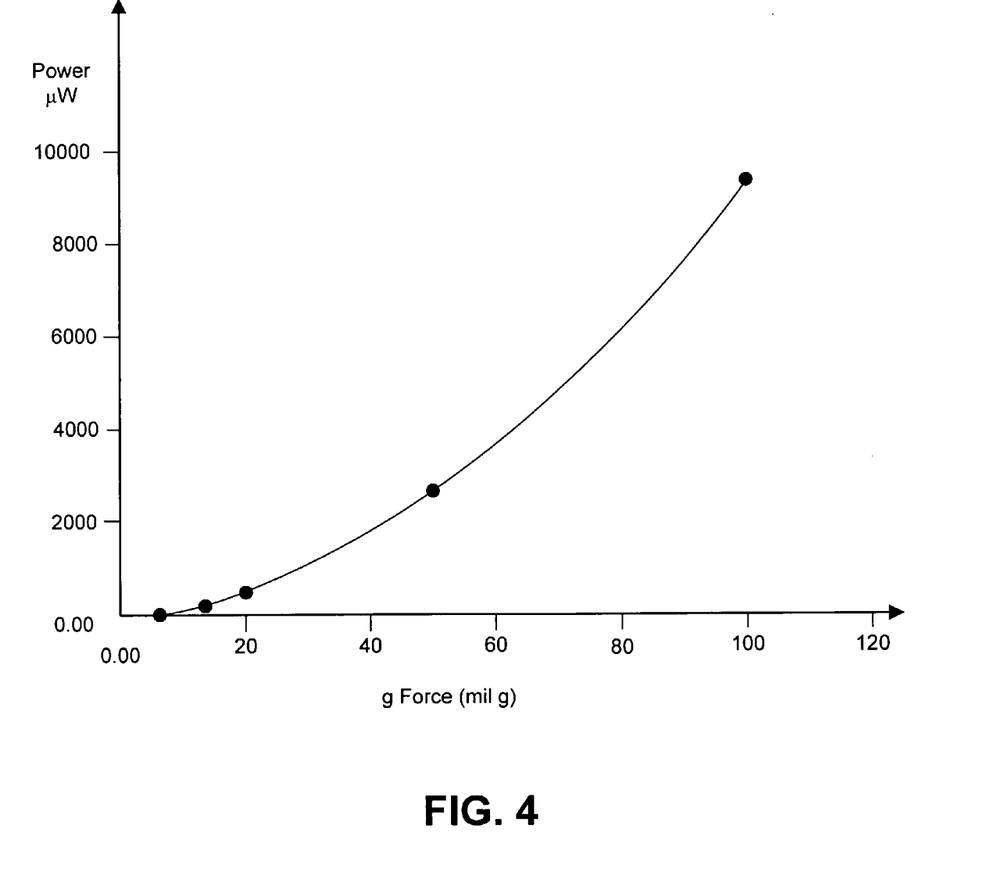
FIG. 4 is a plot of experimental results of the power in microwatts versus acceleration in milli-g of the energy harvester embodiment illustrated in FIG. 3.

FIG. 4 is a plot including the data in Table 1. Model calculations indicate that the harvested power should vary in proportion to the square of the acceleration as is observed in this Figure.

Figure 5:
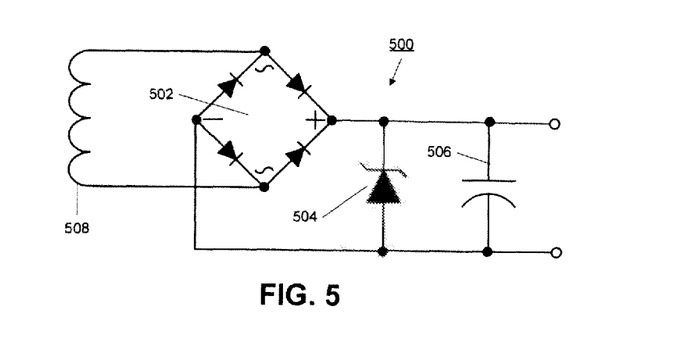
FIG. 5 is a schematic diagram of an illustrative electrical circuit for use with the inventive energy harvesters.

FIG. 5 illustrates an exemplary electrical circuit that can be used with the inventive energy harvester. The electrical signal generated by the inductive coil 508 is rectified by a full-wave diode bridge 502, which charges a capacitor 506. Overcharging of the capacitor 506 may be limited by a Zener diode 504 connected across the storage capacitor 506. The particular demands of any given application will determine the optimum size of the energy storage device, whether it is a capacitor, such as capacitor 506 or rechargeable storage battery. Relatively high current load circuits will require a relatively larger storage capacitor or battery. The drawback of having an oversized storage device is that it takes a longer time for the system to initially become charged up to the full potential. The size of the harvester can vary over a wide range depending on the application conditions. The power harvested scales approximately linearly with its volume assuming no other design changes are made.

Figure 6:
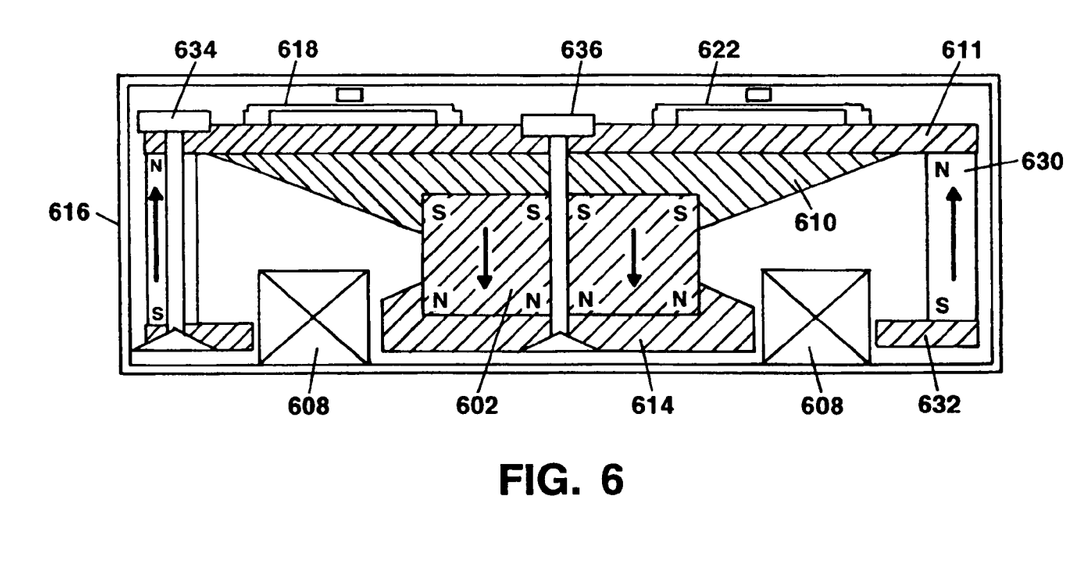
FIG. 6 is a schematic partial cross-sectional diagram of a third embodiment of an inductive vibration energy harvester, constructed in accordance with the principles of the present invention and using a central cylindrical permanent magnet and an outer annular permanent magnet to provide a strong flux density in the gap occupied by the coil.
Figure 7A:
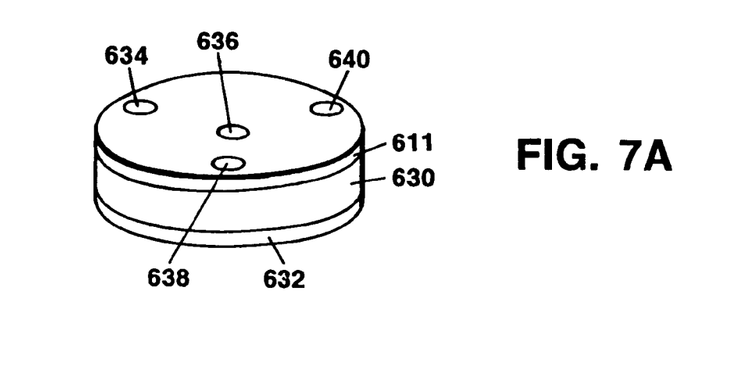
FIG. 7A is a perspective drawing of the magnetic members of the embodiment shown in FIG. 6 with the surrounding housing removed.
Figure 7B:
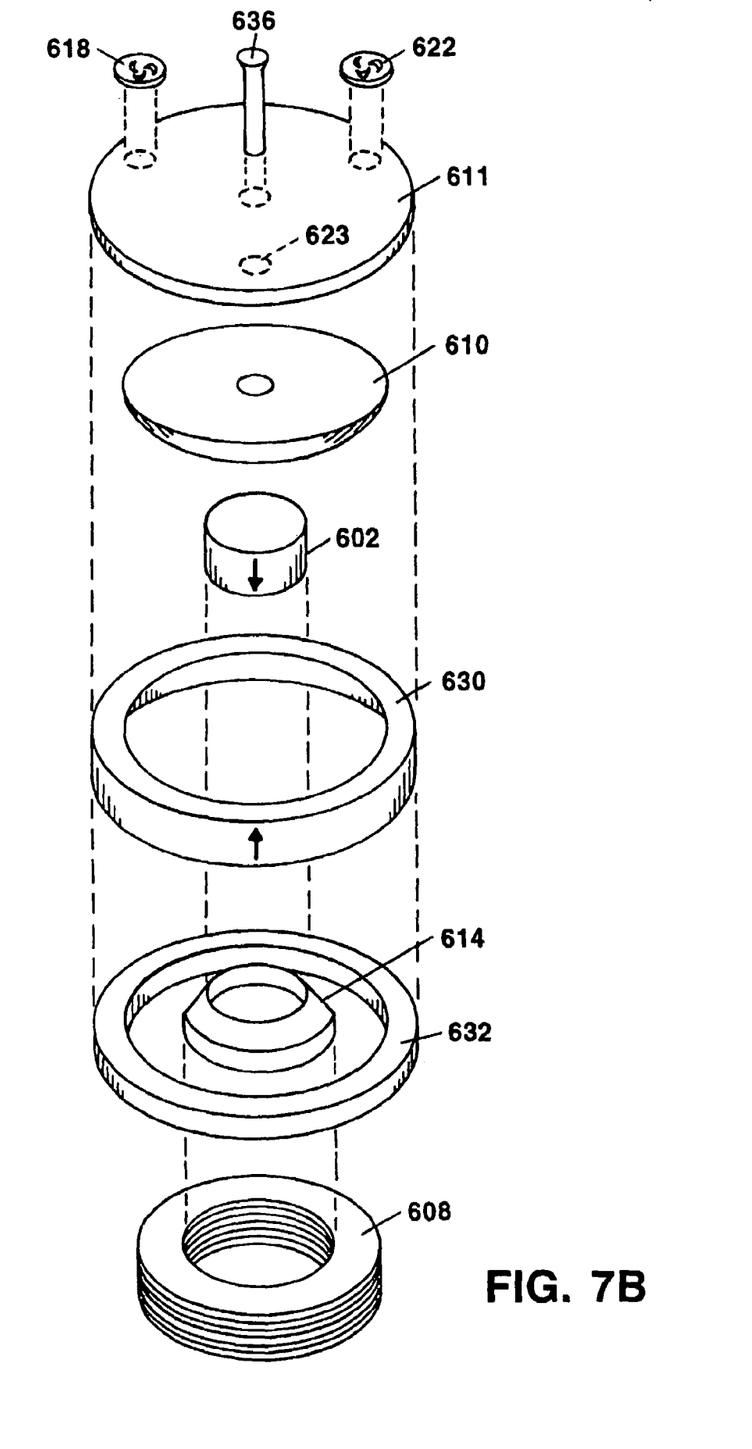
FIG. 7B is an exploded perspective view of the embodiment illustrated in FIGS. 6 and 7A.

FIG. 6 is a cross-sectional diagram and FIGS. 7A and 7B are a perspective view of the magnetic assembly and an exploded perspective view of the magnetic assembly that illustrate another embodiment constructed in accordance with the principles of the present invention wherein the aspect ratio (height to diameter) is significantly reduced from the embodiments illustrated in FIGS. 1 and 3. In FIGS. 6 and 7, elements that correspond to those in FIGS. 1 and 3 have been given corresponding numeral designations. For example, non-magnetic housing 616 in FIG. 6 corresponds to non-magnetic housing 116 and non-magnetic housing 316 in FIGS. 1 and 3, respectively. In this embodiment, as in the other two embodiments, a toroidal electrical coil 608 is mounted on the housing 616 and is stationary while the permanent magnets and soft magnetic assemblies vibrate in response to the external acceleration.

Two permanent magnets are shown, an annular permanent magnet 630 and a disk-shaped magnet 602. The inner magnet 602 is may be replaced in the design by a soft magnetic material such as that used in parts 610, 611, 614 and 632, with some loss of efficiency. The configuration of the permanent magnet field source comprising magnets 602 and 630 is arranged in this embodiment so that a large volume of the magnet is closer to the outer radius of the harvester. If the polarity of one of these magnets 602 and 630 is changed, the other must also be changed to maintain flux continuity in the toroidal magnetic circuit.

The magnetic circuit is completed by soft magnetic members of high permeability and, preferably, high flux density and having the cylindrical symmetry of the device. Four separate magnetic members are used to concentrate the magnetic flux. These include piece 610, piece 611, piece 614 and ring 632. All four pieces are fabricated from a high-permeability, high flux density magnetic material, such as soft iron. Piece 611 and ring 632 can be fastened to the annular permanent magnet 630 by means of pins, of which pin 634 is shown, or by other suitable means. In a similar fashion, pieces 610 and 614 can be fastened to piece 611 and magnet 602 by another pin 636 or by other suitable means.

The entire magnetic assembly is supported from the housing by means of leaf springs or spiral disk springs 618 and 622. A single large spring can be used, or alternatively, several smaller springs can be located symmetrically around the centerline of the device.

Although exemplary embodiments of the invention have been disclosed, it will be apparent to those skilled in the art that various changes and modifications to these embodiments can be made which will achieve all or some of the advantages of the invention without departing from the spirit and scope of the invention. For example, it will be obvious to those reasonably skilled in the art that, in other implementations, other known materials different from those listed may be used. For example, amorphous magnetic alloys such as FeBSi (Metglas® Alloy 2605B) may be suitable for flux concentrators, such as concentrators 114 or 314, for the yoke 112 or 312 or for the pieces, 110 and 310. While the permanent magnets can be fabricated from sintered FeNdB, die-upset FeNdB may be used (with some loss of efficiency) or any variation of sintered Sm—Co or Fe—Nd—B may be used. Other aspects and modifications to the inventive concept are intended to be covered by the appended claims.

What is claimed is:

1. An inductive energy harvester that generates electrical energy from mechanical vibrations, the energy harvester comprising:
   a magnetic field source having a first pole and a second pole that generate a magnetic field;
   an induction coil;
   an induction coil support that positions the induction coil near the first magnetic field source pole; and
   a mechanical connector that mechanically couples the magnetic field source to the induction coil support in a manner that allows relative oscillatory movement between the magnetic field source and the induction coil in response to the vibrations while the coil support maintains the position of the coil near the first pole.

2. The inductive energy harvester of claim 1 further comprising:
   a flux concentrator attached to the first pole in order to concentrate the magnetic field emerging from the first pole in the vicinity of the induction coil.

3. The inductive energy harvester of claim 1 wherein the mechanical connector comprises a spiral disk spring.

4. The inductive energy harvester of claim 1 wherein the mechanical connecter comprises a pair of spiral disk springs.

5. The inductive energy harvester of claim 1 wherein the mechanical connector comprises at least one leaf spring.

6. The inductive energy harvester of claim 1 wherein the mechanical connector comprises at least one coil spring.

7. The inductive energy harvester of claim 1 further comprising a flux yoke attached to the second magnetic field source pole to provide a low reluctance flux path between the first and second magnetic field source poles.

8. The inductive energy harvester of claim 7 wherein the flux yoke surrounds the magnetic field source.

9. The inductive energy harvester of claim 7 wherein the mechanical connector attaches to the flux yoke.

10. The inductive energy harvester of claim 9 further comprising a non-magnetic housing and wherein the mechanical conneceter attaches to the housing.

11. The inductive energy harvester of claim 7 wherein the flux yoke is a magnet having a polarization that enhances magnetic flux in the vicinity of the induction coil.

12. The inductive energy harvester of claim 11 wherein the flux yoke comprises an annular permanent magnet.

13. The inductive energy harvester of claim 1 wherein the induction coil surrounds one pole of the magnetic field source.

14. The inductive energy harvester of claim 1 wherein the magnetic field source is a permanent magnet.

15. The inductive energy harvester of claim 1 further comprising a second magnetic field source arranged in magnetic flux opposition to the magnetic field source.

16. The inductive energy harvester of claim 15 further comprising a magnetic flux concentrator positioned between the magnetic field source and the second magnetic field source and in the vicinity of the induction coil.

17. The inductive energy harvester of claim 1 further comprising:
   an electrical circuit to process electrical energy generated by the coil in response to the vibrations for storage or use by other devices.

18. The inductive energy harvester of claim 17 further comprising:
an energy storage device for storing electrical energy generated by the coil in response to the vibrations.

19. The inductive energy harvester of claim 1 further comprising:
an electrical circuit to process an electrical signal generated by the coil in response to the vibrations for storage in an energy storage device.

20. The inductive energy harvester of claim 1 wherein:
the coil support positions the coil so that the coil surrounds the first pole;
a flux concentrator is attached to the source and positioned in the vicinity of the coil; and
a flux yoke surrounds the coil and source.

21. The inductive energy harvester of claim 1 wherein:
a second magnetic field source having first and second poles is arranged in magnetic flux opposition to the magnetic field source such that the induction coil support positions the induction coil near the first poles of each source, and the mechanical connector couples both sources to allow relative oscillatory movement between the sources and coil in response to the vibrations while the coil support maintains the position of the coil near the first poles; and
a flux concentrator is positioned between the magnetic field source and the second magnetic field source and in the vicinity of the induction coil.

22. An inductive energy harvester that generates electrical energy from mechanical vibrations, the energy harvester comprising:
a magnetic field source having a first pole and a second pole that generate a magnetic field;
an induction coil;
an induction coil support that positions the induction coil near the first magnetic field source pole;
a mechanical connector that mechanically couples the magnetic field source to the induction coil support in a manner that allows relative movement between the magnetic field source and the induction coil in response to the vibrations;
a flux yoke attached to the second pole of the magnetic field source to provide a low reluctance flux path between the first and second poles of the magnetic field source; and
wherein the mechanical connector attaches to the flux yoke.

23. The inductive energy harvester of claim 22 further comprising a non-magnetic housing and wherein the mechanical connecter attaches to the housing.

24. An inductive energy harvester that generates electrical energy from mechanical vibrations, the energy harvester comprising:
a magnetic field source having a first pole and a second pole that generate a magnetic field;
an induction coil;
an induction coil support that positions the induction coil near the first magnetic field source pole;
a mechanical connector that mechanically couples the magnetic field source to the induction coil support in a manner that allows relative movement between the magnetic field source and the induction coil in response to the vibrations;
a flux yoke attached to the second pole of the magnetic field source to provide a low reluctance flux path between the first and second poles of the magnetic field source; and
wherein the flux yoke is a magnet having a polarization that enhances magnetic flux in the vicinity of the induction coil.

25. The inductive energy harvester of claim 24 wherein the flux yoke comprises an annular permanent magnet.

26. An inductive energy harvester that generates electrical energy from mechanical vibrations, the energy harvester comprising:
a magnetic field source having a first pole and a second pole that generate a magnetic field;
an induction coil;
an induction coil support that positions the induction coil near the first magnetic field source pole;
a mechanical connector that mechanically couples the magnetic field source to the induction coil support in a manner that allows relative movement between the magnetic field source and the induction coil in response to the vibrations;
a second magnetic field source arranged in magnetic flux opposition to the magnetic field source; and
a magnetic flux concentrator positioned between the magnetic field source and the second magnetic field source and in the vicinity of the induction coil.

* * * * *